US008402517B2

(12) United States Patent
Hawkins et al.

(10) Patent No.: US 8,402,517 B2
(45) Date of Patent: Mar. 19, 2013

(54) CONTENT DISTRIBUTION AND EVALUATION PROVIDING REVIEWER STATUS

(75) Inventors: Dax Hawkins, Kirkland, WA (US); Julien Jacques Nicolas Ellie, Redmond, WA (US); Boyd Cannon Multerer, Redmond, WA (US); Shelley McKinley, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 11/766,072

(22) Filed: Jun. 20, 2007

(65) Prior Publication Data

US 2008/0320568 A1    Dec. 25, 2008

(51) Int. Cl.
*G06F 17/30* (2006.01)
*G06F 7/04* (2006.01)
(52) U.S. Cl. ............ 726/5; 726/18; 726/27; 726/4; 705/26; 434/350; 707/754
(58) Field of Classification Search ............ 726/2–8
See application file for complete search history.

(56) References Cited

U.S. PATENT DOCUMENTS

| 6,272,637 B1 * | 8/2001 | Little et al. ............ 713/194 |
| 6,321,179 B1 * | 11/2001 | Glance et al. ............ 702/189 |
| 6,895,385 B1 | 5/2005 | Zacharia et al. ............ 705/10 |
| 7,162,471 B1 | 1/2007 | Knight et al. ............ 707/3 |
| 7,328,406 B2 * | 2/2008 | Kalinoski et al. ............ 715/738 |
| 7,343,294 B1 * | 3/2008 | Sandholm et al. ............ 705/7.29 |
| 7,437,772 B1 * | 10/2008 | Thenthiruperai et al. ...... 726/30 |
| 7,451,217 B2 * | 11/2008 | Wardrop ............ 709/225 |
| 7,733,804 B2 * | 6/2010 | Hardjono et al. ............ 370/254 |
| 7,739,289 B2 * | 6/2010 | McAllister et al. ............ 707/754 |
| 7,747,680 B2 * | 6/2010 | Ravikumar et al. ............ 709/203 |
| 7,756,753 B1 * | 7/2010 | McFarland ............ 705/26.1 |
| 7,895,275 B1 * | 2/2011 | Evans et al. ............ 709/206 |
| 7,984,509 B2 * | 7/2011 | Ginter et al. ............ 726/27 |
| 8,032,539 B2 * | 10/2011 | Ebadollahi et al. ............ 707/754 |
| 2001/0037460 A1 | 11/2001 | Porcari ............ 713/201 |
| 2002/0087600 A1 * | 7/2002 | Newbold ............ 707/514 |

(Continued)

FOREIGN PATENT DOCUMENTS

WO    WO 2005/078609 A1    8/2005

OTHER PUBLICATIONS

Benjamin Snyder, Multiple aspect ranking using Good Grief Algorithm, Apr. 2007, Association of Computational Linguistics, vol. Apr. 2007, pp. 2-6.*

(Continued)

*Primary Examiner* — Nathan Flynn
*Assistant Examiner* — Viral Lakhia
(74) *Attorney, Agent, or Firm* — Woodcock Washburn LLP

(57) ABSTRACT

A content distribution system may be provided for reviewing content such as video games, music, movies, or the like that may be shared by the system. The content distribution system may receive a credential from a user and authenticate the user based on the credential to permit access to the system. The content distribution system may also receive content generated by the user if the user may be authenticated. The content distribution system may provide the received content to a content evaluation entity, for example. The content distribution system may receive a review for the content from the content review entity and then may determine whether the content passes a review process based on the review, for example. The content distribution system may provide additional access to the content if the content passes the review process.

19 Claims, 5 Drawing Sheets

U.S. PATENT DOCUMENTS

| | | | | |
|---|---|---|---|---|
| 2003/0074267 A1* | 4/2003 | Acharya et al. | | 705/26 |
| 2003/0191719 A1* | 10/2003 | Ginter et al. | | 705/54 |
| 2004/0030930 A1* | 2/2004 | Nomura | | 713/201 |
| 2004/0107365 A1 | 6/2004 | Hogg | | 713/201 |
| 2004/0123135 A1* | 6/2004 | Goddard | | 713/200 |
| 2004/0225730 A1* | 11/2004 | Brown et al. | | 709/224 |
| 2005/0033990 A1* | 2/2005 | Harvey et al. | | 713/201 |
| 2005/0060404 A1 | 3/2005 | Ahlander et al. | | 709/224 |
| 2005/0131722 A1 | 6/2005 | Hillis et al. | | 75/1 |
| 2006/0047531 A1 | 3/2006 | Leung et al. | | 705/1 |
| 2006/0179478 A1* | 8/2006 | Han et al. | | 726/5 |
| 2006/0229993 A1 | 10/2006 | Cole | | 705/51 |
| 2006/0282304 A1* | 12/2006 | Bedard et al. | | 705/10 |
| 2006/0282336 A1 | 12/2006 | Huang | | 705/26 |
| 2007/0143122 A1* | 6/2007 | Holloway et al. | | 705/1 |
| 2007/0255702 A1* | 11/2007 | Orme | | 707/5 |
| 2008/0071784 A1* | 3/2008 | Hertzog | | 707/7 |
| 2008/0077454 A1* | 3/2008 | Shepherd et al. | | 705/5 |
| 2008/0168045 A1* | 7/2008 | Suponau et al. | | 707/5 |
| 2009/0112974 A1* | 4/2009 | Ravikumar et al. | | 709/203 |

OTHER PUBLICATIONS

Needleman, R., "Helium Brings Peer Review—and Money—to Everyday Advice", http://www.webware.com, Oct. 23, 2006, 4 pages.

Supekar, K., "A Peer-Review Approach for Ontology Evaluation", *Section on Medical Informatics*, 3 pages, Aug. 4, 2009 v. 1.

Till, J.E., "Peer Review in a Post-Eprints World: A Research Proposal", *Clinical Medicine & Health Research*, Mar. 21, 2000, http://clinmed.netprints.org, 6 pages.

Young, J.R., "Merlot Project brings Peer Review to Web Materials for Teaching", The Chronicle Daily News, Jun. 1, 2000, 2 pages.

* cited by examiner

400

CONTENT DISTRIBUTION AND EVALUATION PROVIDING REVIEWER STATUS

BACKGROUND

Today, user generated content such as, for example, videos, music, movies, video games, or the like has become increasingly popular. To distribute such content, a user may register with a network based web server that may allow the user to store his or her content such that access may be provided to, for example, other registered and unregistered users. For example, a user may register with one or more popular video sharing websites such that the user may upload, view, and share video clips.

Typical network based web servers that may allow a user to store and/or share his or her content do not provide a rating or review of the content before distribution to other users. Instead, the content may become immediately available such that other users may immediately access the content. If the content is offensive, illegal, or the like, the network based web servers must rely upon other users for notification of the content's offensive and/or illegal nature. Unfortunately, offensive and/or illegal content may have already been accessed by, for example, children, or other users before the content may be removed. Additionally, the network based web servers must constantly and unnecessarily remove such content.

SUMMARY

According to example embodiments, a content distribution system may maintain and digitally distribute content such as videos, music, video games, or the like. For example, the content distribution system may receive content generated by one or more users. The received content may then be reviewed by the system and/or rated by a content review group. Based on the review, for example, the system may determine whether to allow the received content to be publicly accessible to additional users. The system may also establish one or more criteria that may be used to rate the content review group reviewing the received content. Thus, according to one embodiment, the system may provide reviewed content that may be shared amongst users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF ILLUSTRATIVE EMBODIMENTS

Figure 1:
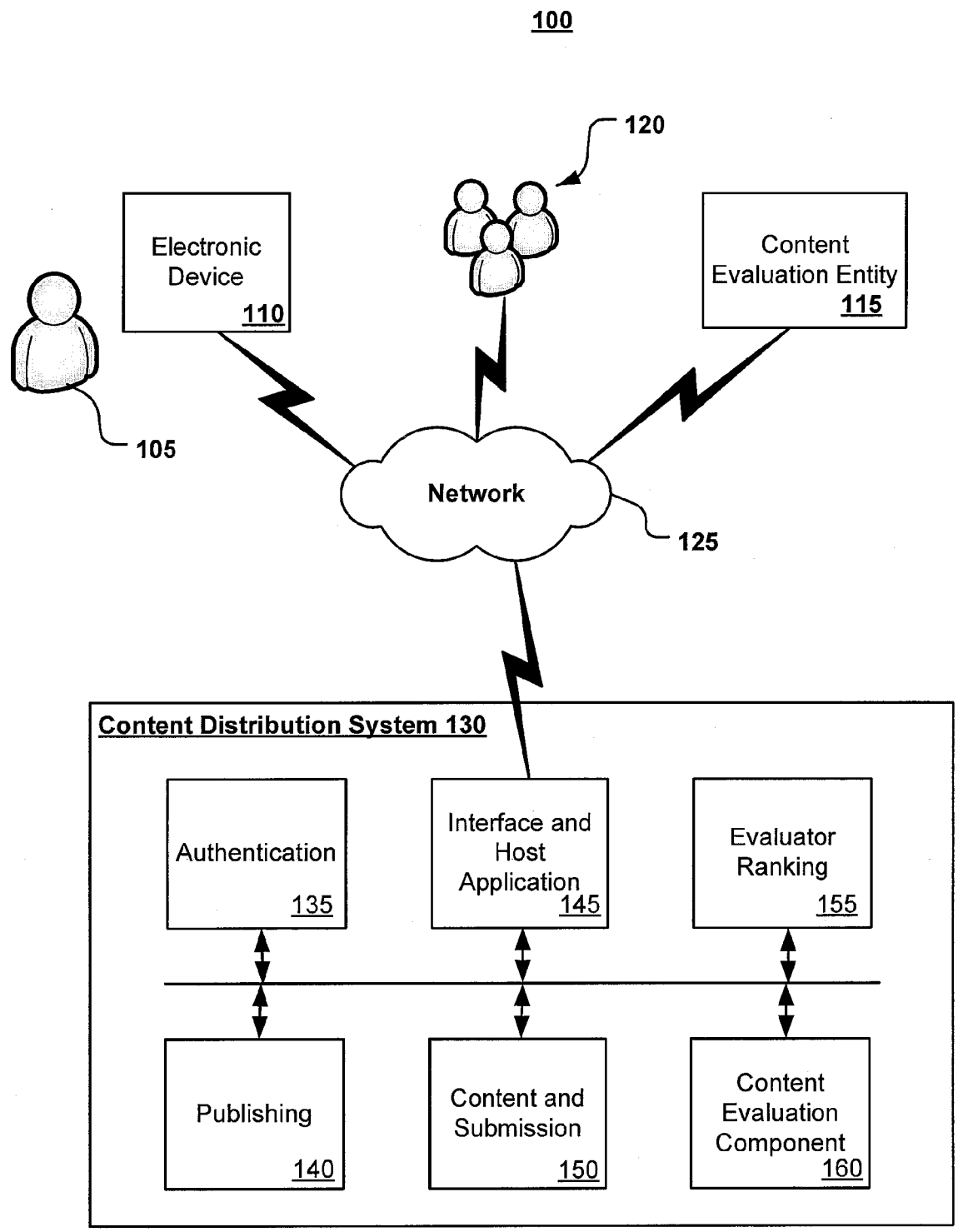
FIG. 1 depicts an example configuration of a content distribution system.

FIG. 1 depicts an example embodiment 100 of content distribution system 130 in communication with user 105 of electronic device 110, users 120 that may be using one or more electronic devices (not shown), and content evaluation entity 115. User 105 may be an author or creator of content such as video games, videos, music, movies, or the like. Additionally, user 105 may review content and/or consume content. According to one embodiment, user 105 may be a registered user of content distribution system 130 such that user 105 may provide content to content distribution system 130 that may be shared with other users such as users 120. Additionally, users 120 may be unregistered users of content distribution system 130 such that users 120 may access content provided by registered users such as users 105 and/or content distribution system 130. Thus, according to one embodiment, users 120 may be consumers of content such as the content that may be created by user 105.

In one embodiment, content evaluation entity 115 may be a community of evaluators, a peer review group, or the like that may review and/or rate content such as video games, music, movies, videos, or the like that may be provided by content distribution system 130. For example, the community of evaluators may review and/or rate content provided by content distribution system 130. According to one embodiment, the evaluators may provide a content review that may include, for example, a numerical representation indicative on whether the content evaluation entity may agree or disagree with the content and/or descriptors that may be provided by the users. Additionally, the content review may be a quantitative indicator of whether the content may be humorous, enjoyable, appropriate for a class of users such as users 120, or the like. For example, the content review may include an indication of a level of violence of content, the maturity of content, the playability of content, the technical difficult of content such as video games, and/or quality of content such as graphical quality. The content review may be received by content distribution system 130, which will be described in more detail below.

Additionally, in an example embodiment, the community of evaluators may make a content decision. The content decision may indicate whether to provide access to the content to other users such as users 120. For example, content evaluation entity 115 may provide a decision on whether to allow access to the content to additional users such as users 120 based on whether the content may be offensive, illegal such as infringe intellectual property rights, or the like. The decision may also be received by content distribution system 130, which will be described in more detail below.

User 105 may communicate with content distribution system 130 using, for example, electronic device 110. Electronic device 110 may include hardware components such as a processor, a graphics card, a storage component, a memory component, a memory card reader, an antenna, a communication port, a disc drive, or the like. Electronic device 110 may also include software components such as an operating system that may control the hardware components, one or more application programs such as web browser software, or the like. Electronic device 110 may include any other suitable components such that user 105 may receive content including videos, music, video games, movies or the like from user 105 via network 125, which will be described in more detail below. According to example embodiments, electronic device 110 may be a video game system, a computer, a cellular telephone, a PDA, a server, or the like.

Electronic device 110 may be in communication with content distribution system 130 via network 125 such that user 105 may access content distribution system 130. Network 125 may be any network, such as a Local Area Network (LAN), a Wide Area Network (WAN), the Internet, or the like. Content distribution system 130 may include any combination of hardware components such as processors, databases, storage drives, registers, cache, RAM memory chips, data buses, or the like and/or software components such as operating systems, database management applications, or the like. According to an example embodiment, content distribution system 130 may be a network-based server that may provide digital content such as video games, music, movies, videos, or the like to users such as user 105. Additionally, as described above, the content may be generated by users such as user 105. For example, user 105 may design and publish a video game that may be provided to content distribution system 130 such that the access to play the video game, for example, may be provided to additional users or consumers such as users 120 via content distribution system 130.

Content distribution system 130 may include any combination of systems and sub-systems. According to one embodiment, content distribution system 130 may include authentication module 135, publishing module 140, interface and host application 145, content and submission module 150, evaluator ranking module 155, and content evaluation component 160. Authentication module 135, publishing module 140, interface and host application 145, content and submission module 150, evaluator ranking module 155, and content evaluation component 160 may be in operative communication with each other via, for example a bus or any other subsystem that may transfer data between computer components such as the modules in content distribution system 130.

Interface and host application 145 of content distribution system 130 may interface with network 125 to provide communication between user 105 of electronic device 110 and various components and features of content distribution system 130, for example. Interface and host application 145 may include software components such as operating systems, Web-based management applications, or the like such that interface and host application 145 may provide the overall infrastructure and may be the primary consumer of content that may be stored and published by content distribution system 130. For example, interface and host application 145 may include a web interface, a rich object, a developer environment plug in, or the like. Interface and host application 145 may maintain its own processes, such as user management and/or content rules required to make intelligent use of the content that may be provided to and by user 105 via electronic device 110, for example. Interface and host application 145 may also serve to interact and interface with the other functional components of content distribution system 130 including authentication module 135, publishing module 140, content and submission module 150, evaluator ranking module 155, and content evaluation component 160.

Additionally, interface and host application 145 may present an interface to user 105 via electronic device 110. For example, interface and host application 145 may provide an interface to handle the submission and distribution of content such as video games, music, movies, videos, or the like that may be received from user 105 using electronic device 110. According to one embodiment, interface and host application 145 may provide a user management function that may be responsible for maintaining the association of users with accounts to submit and receive content. Thus, according to an example embodiment, interface and host application 145 may receive content from user 105, for example, and may provide a display such as a Web page that may be used to distribute the content provided by, for example, user 105 to additional users such as users 120 of content distribution system 130.

Authentication module 135 may include any combination of hardware components such as processors, databases, storage drives, registers, cache, memory chips, data buses, or the like and/or software components such that authentication module 135 may provide a mechanism for authentication of one or more users of content distribution system 130 such as user 105. Typically, users such as user 105 may be authenticated by supplying a credential such as an account number, username, Personal Identification Number (PIN), password, or the like before services such as uploading and/or downloading content using content distribution system 130. Additionally, once a user has been authenticated, content distribution system 130 may cache the authentication status to prevent unnecessary external authentication requests, for example. Authentication module 135 may also verify whether users such as user 105 may be a registered user or an unregistered user. For example, authentication module 135 may be used to determine whether user 105 may be registered to provide content to and access content from content distribution system 130 or whether user 105 may be unregistered to access content from content distribution system 130. Authentication module 135 may perform the authentication itself Additionally, authentication module 135 may delegate authentication authority to an authentication mechanism such as a Web-based authentication service. In one embodiment, authentication module 135 may include bridges to various possible points of authentication such as the host application, the user's enterprise domain, or local cache of content distribution system 130. Additionally, the passing of session-specific tokens, or other artifacts, to identify the context under which a user such as user 105 may interact with content distribution system 130 may be managed by authentication module 135 in co-operation with interface and host application 145, according to one embodiment.

Content distribution system 130 may also include publishing module 140. Publishing module 140 may include any combination of hardware components such as processors, databases, storage drives, registers, cache, RAM memory chips, data buses, or the like and/or software components. User 105 and/or processes internal to content distribution system 130 may use publishing module 140 to manipulate, display, or manage content including, but not limited to, video games, music, movies, videos, or the like that may be provided by content distribution system 130, for example. Content distribution system 130 may receive content and/or distribute content in a variety of ways including, but not limited to, Hypertext Transfer Protocol (HTTP) and/or Secure Hypertext Transfer Protocol (HTTP/S) for simple Web-based access, Simple Main Transfer Protocol (SMTP), Web Services/Simple Object Access Protocol (SOAP) for a programmatic way to access the content, File Transfer Protocol (FTP) for transferring content between, for example, user 105 of electronic device 110 and content distribution system 130 via network 125, and Sharepoint for online review and collaboration of the content. For example, according to one embodiment, publishing module 140 may generate displays such as Web pages that may be delivered to user 105 via HTTP using interface and host application 145. The user may then upload or download content by interfacing with the display that may be generated by publishing module 140. Publishing module 140 may receive the content from content and submission module 150, which will be described in more detail below. In one embodiment, publishing module 140 may be used to provide the content publicly or to a restricted group or entity such as content evaluation entity 115, for example. Additionally, publishing module 140 may provide a search engine that may be used by additional users such as users 120 to find content that may be publicly accessible, for example.

According to one embodiment, content distribution system 130 may further include content and submission module 150. Content and submission module 150 may be configured to interface with a user, receive submitted content and/or store content such as video games, music, movies, videos, or the like. Additionally, content and submission module 150 may be configured for limiting access to the content stored therein. Content and submission module 150 may include, for example, a database, RAM memory chips, cache, registers, hard drives, or any other suitable hardware components designed to store content such as video games, music, movies, videos, or the like that may be provided and accessed by user 105. Content and submission module 150 may store one or more descriptors such as metadata with the content. The descriptors may include additional information that may describe the content including, but not limited to, genre, category, maturity rating, pricing, copyright information, screen shots, search tags, or the like.

According to one embodiment, the content that may be stored in content and submission module 150 may be indexed by the credential such as the account number, username, Personal Identification Number (PIN), password, or the like that may be provided by user 105 to access content distribution system 130. For example, content and submission module 150 may include a database that may store content provided by registered users. The content may be implemented as a tree within content and submission module 150 such that the credential may be the root of the tree. Alternatively, the content may be organized as hierarchy with the credential being the top of the hierarchy. Under each credential in the tree or hierarchy may be, for example, content corresponding to a registered user such as user 105, for example.

Additionally, content distribution system 130 may include evaluator ranking module 155. Evaluator ranking module 155 may be configured to store a ranking associated with content evaluation entity 115. Evaluator ranking module 155 may include, for example, a database, RAM memory chips, cache, registers, hard drives, or any other suitable hardware components designed to store a ranking corresponding to content evaluation entity 115. For example, content evaluation entity 115 may include one or more evaluators, or reviewers of the content such as video games, music, movies, videos, or the like that may be provided by content distribution system 130. As described above, content evaluation entity 115 may provide a rating and/or review of the content provided by content distribution system 130. If, based on the rating and/or review, the content becomes publicly accessible to additional users such as users 120, users 120 may rank content evaluation entity 115. For example, users 120 may rank the rating using a numerical scale. In one embodiment, a 0 on the numerical scale may indicate users 120 may totally disagree with the review indicating a low ranking and a 10 may indicate users 120 totally agree with the review indicating a high ranking. The numerical values therebetween may indicate a satisfaction or an agreement between the low to high rankings, for example. The rankings that may be provided by users 120 may be a general ranking. Additionally, users 120 may rank the rating and/or review in one or more categories such as whether users 120 agree that the game may be fun, whether users 120 agree that the content may include intellectual property infringement, or the like. Thus, according to one embodiment, evaluator ranking module 155 may store feedback for ratings and/or reviews provided by content evaluation entity 115.

Additionally, evaluator ranking module 155 may store one or more permissions associated with the ranking for each reviewer and/or evaluator. For example, if users 120 disagree with the review and/or rating provided by content evaluation entity 115, users 120 may provide a low ranking such as a 0. Thus, according to one embodiment, if content evaluation entity 115 allows content to be published to additional users or consumers such as users 120 even though a rating provided by user 105 for his or her content may be inaccurate, the additional users or consumers may provide a message to the content distribution system 130 indicating the content and/or descriptors may be inappropriate. The message may be used by content distribution system 130 to provide a low ranking for content evaluation entity 115. Additionally, according to one embodiment, the additional users or consumers may also provide a low ranking themselves for content evaluation entity 115 based the decision or review by content evaluation entity 115 that may enable content to be published. The low ranking may be used to change one or more permissions that may be given to content evaluation entity 115. For example, a content review entity such as content evaluation entity 115 may need to meet a threshold ranking in one or more categories and/or a general threshold ranking, before access to review or evaluate content may be granted by content distribution system 130.

According to one embodiment, the rankings and/or permissions that may be stored in evaluator ranking module 155 may be indexed by the credential such as the account number, username, Personal Identification Number (PIN), password, or the like that may be provided by content evaluation entity 115 to access content distribution system 130. For example, evaluator ranking module 155 may include a database that may store a ranking and permissions to rank and/or review associated with each content evaluation entity such as content evaluation entity 115. The rankings and/or permissions may be implemented as a tree within evaluator ranking module 155 that the credential may be the root of the tree. Alternatively, the ranking and/or permissions may be organized as hierarchy with the credential being the top of the hierarchy. Under each credential in the tree or hierarchy may be, for example, a ranking and/or permissions corresponding to a reviewer or content evaluation such as content evaluation entity 115, for example.

Content distribution system 130 may also include content evaluation component 160. Content evaluation component 160 may include any combination of hardware components such as processors, databases, storage drives, registers, cache, RAM memory chips, data buses, or the like and/or software components such as operating systems, database management applications, or the like. In one embodiment, content evaluation component 160 may review content received from a user such as user 105. For example, in one embodiment, content evaluation component 160 may determine whether content received from user 105 includes descriptors such as metadata, or the like that may be used to classify the content for distribution.

According to one embodiment, user 105 may provide content to content distribution system 130 by, for example, uploading the content to content distribution system 130. User 105 may be prompted to provide one or more descriptors that may be associated with the content. The content and corresponding descriptors may be stored in content and submission module 150 and may be reviewed by content evaluation component 160, which will be described in more detail below.

Figure 2:
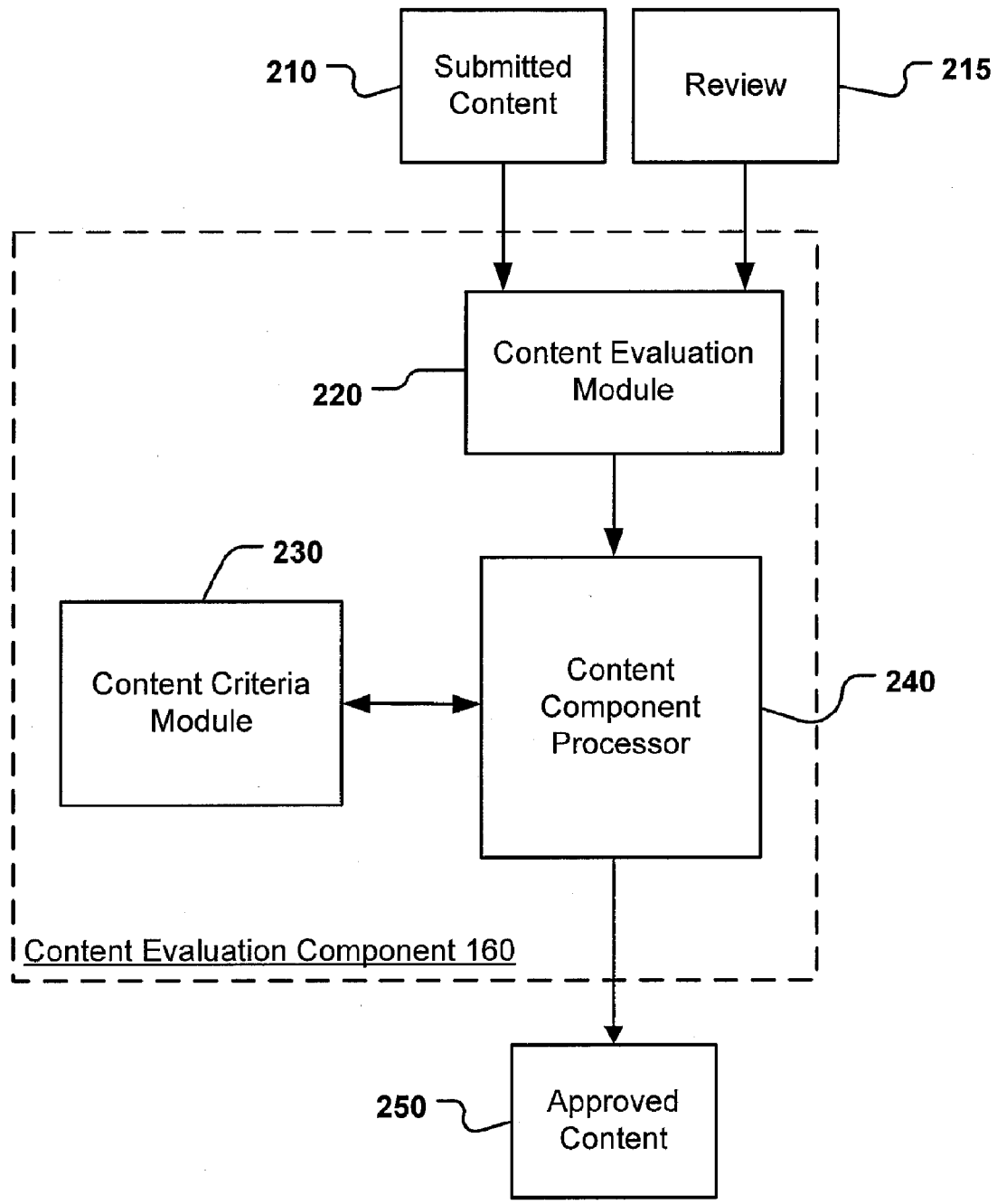
FIG. 2 depicts an example embodiment of a content evaluation component.

FIG. 2 depicts an example embodiment of content evaluation component 160. Content evaluation component 160 may be implemented using a variety of techniques and hardware components, including but not limited to, servers, databases, microchips, storage devices, processors, programmed modules, or the like.

As shown in FIG. 2, content evaluation component 160 may include content evaluation module 220. Content evaluation module 220 may receive and store submitted content 210 provided by, for example, a user of content distribution system 130 such as user 105, shown in FIG. 1. Content evaluation module 220 may include, for example, RAM memory chips, registers, hard drives, or any other suitable hardware components designed to store data. In one embodiment, content evaluation module 220 may be in operative communication with user 105 of electronic device 110 via interface and host application 145, shown in FIG. 1, and may receive submitted content 210 that may be generated by user 105 using electronic device 110, for example. Additionally, content evaluation module 220 may be in operative communication with content and submission module 150 and may receive submitted content 210 stored in content and submission module 150. Submitted content 210 may include, for example, digital content such as video games, music, movies, videos, or the like that may be generated by a creator or author such as user 105, for example. Submitted content 210 may also include one or more descriptors such as metadata that may describe the digital content. For example, submitted content 210 may include a video game. Associated with the video game may be a descriptor such as metadata that may include information such as a rating that may be provided by, for example, user 105. The information may also include genre, category, maturity rating, or the like that may further describe the video game.

Additionally, content evaluation module 220 may receive and store content review 215 for submitted content 210 provided by, for example, a content evaluation entity such as content evaluation entity 115, as shown in FIG. 1. For example, in one embodiment, content evaluation module 220 may be in operative communication with content evaluation entity 115 via interface and host application 145, shown in FIG. 1, and may receive content review 215 that may be provided by, for example, an evaluator or reviewer of submitted content 210. Additionally, as described above, content evaluation module 220 may be in operative communication with content and submission module 150 and may receive content review 215 from content and submission module 150. Content review 215 may include, for example, a numerical value and/or weight that may correspond to a number of stars that may be used to determine the quality of submitted content 210.

According to one embodiment, content review 215 may include a quantitative indicator on whether to publish the content. For example, content review 215 may include a quantitative indicator on whether the content evaluation entity may agree or disagree with submitted content 210 and/or descriptors associated therewith including a rating provided by a user that may have created submitted content 210 such as user 105. Additionally, content review 215 may include a quantitative indicator of whether submitted content 210 may be humorous, enjoyable, or the like by an evaluator or reviewer such as content evaluation entity 115. In one embodiment, content review 215 for submitted content 210 may be between ten stars, which may indicate the highest rating, to zero stars, which may indicate the lowest rating. Thus, according to one embodiment, content review 215 may include a numerical value such as ten indicative of the number of stars given by content evaluation entity 115, for example.

Content evaluation component 160 may further include content criteria module 230 that may be configured to store information for determining whether to provide content to content evaluation entity 115 or to additional such as users 120. Content criteria module 230 may include, for example, RAM memory chips, registers, hard drives, or any other suitable hardware components designed to store data. Content criteria module 230 may include one or more rules such as, for example, a threshold review indicating the quantitative threshold such as the number of stars needed before content such as submitted content 210 may be accessed by additional users such as users 120. In one embodiment, the threshold review may include a weight or numerical value that may need to be received from the reviewers or evaluators such as content evaluation entity 115 before content may be published by content distribution system 130. For example, the reviewers or evaluators such as content evaluation entity 115 may provide a numerical weight or value indicative of whether the reviewers or evaluators agree or disagree with the descriptors and/or rating provided by, for example, the creator or author of content such as user 105. Content criteria module 230 may further include, for example, a format or file extension requirement of submitted content 210, a technical quality such as a required bit rate of submitted content 210, a list of valid descriptors that may be provided by user 105 and associated with submitted content 210, or the like.

Content evaluation component 160 may further include content processor component 240. Content processor component 240 may be in operative communication with content evaluation module 220 and content criteria module 230, as shown in FIG. 2. Content processor component 240 may include, for example, a standard processor, a specialized processor, or the like. Content processor component 240 may engage in an initial analysis of submitted content 210 by comparing, for example, the format of submitted content 210, the technical quality of submitted content 210 and/or descriptors associated with submitted content 210 stored in content evaluation module 220 with one or more rules or criteria stored in content criteria module 230. If content processor component 240 determines, for example, the format of submitted content 210, the technical quality of content submitted 210 and/or the descriptors associated with submitted content 210 may correspond to one or more rules or criteria in content criteria module 230, content processor component 240 may add submitted content 210 to content and submission module 150. In one embodiment, content and submission module 150 may store submitted content 210 such that submitted content 210 may be accessed by a content evaluation entity such as content evaluation entity 115. Additionally, content processor component 240 may transmit submitted content 210 directly to content evaluation entity 115, shown in FIG. 1.

In one embodiment, as described above, content evaluation entity 115 may review submitted content 210. Content distribution system 130 may then determine whether to provide access to submitted content 210 to additional users based on the review. For example, content evaluation component 160 may receive and store content review 215 associated with submitted content 210 from content evaluation entity 115. Content processor component 240 may then compare content review 215 with a threshold review that may be stored in content criteria module 230. If content review 215 exceeds the threshold review, content processor component 240 may add submitted content 210 to content and submission module

150 such that submitted content 210 may be accessed by additional users such as users 120, shown in FIG. 1. For example, content processor component 240 may provide approved content 250 that may correspond to the submitted content 210 to content and submission module 150, if submitted content 210 exceeds the threshold review. Alternatively, if the content review 215, exceeds a negative threshold review, submitted content 210 may be removed from content distribution system 130. According to one embodiment, if the content review neither exceeds a threshold review or negative threshold review, submitted content 210 may be stored in content distribution system 130 until additional reviews may be provided by content evaluation entity 115 such that the additional reviews may provide a content review such as content review 215 to exceed the threshold review or negative threshold review. For example, multiple evaluators may review submitted content 210 and provide a separate content review 215. Each content review 215 may be added to a stored cumulative content review in, for example, content evaluation module 220. The stored cumulative content review may then be compared to the threshold each time an additional content review 215 may be provided by content evaluation entity 115.

Additionally, as described above, content evaluation entity 115 may review submitted content 210 such that content evaluation entity 115 may decide whether submitted content 210 may be accessed by additional users such as users 120. For example, after the initial analysis, submitted content 210 may be stored in content and submission module 150 such that limited access to submitted content 210 may be provided to content evaluation entity 115. Content evaluation entity 115 may review submitted content 210 for intellectual property infringement, maturity rating, offensiveness, obscenity, or the like. Content distribution system 130 may receive a content decision for submitted content 210. If the content decision may indicate approval, content processor component 240 may add submitted content 210 to content and submission module 150 such that submitted content 210 may be accessed by additional users such as users 120, shown in FIG. 1. For example, if the content decision may indicate approval, content processor component 240 may publish approved content 250 that may correspond to submitted content 210 such that additional users or consumers such as users 120 may access approved content 250. Submitted content 210 may not be published as approved content 250 until content evaluation entity 115 may provide an approval for submitted content 210 that may indicate submitted content 210 conforms with an agreement between, for example, content evaluation system 130 and content evaluation entity 115.

Thus, according to example embodiments, content such as approved content 250 may be shared with users 120, shown in FIG. 1. For example, users 120 may search content and submission module 150 for approved content 250 and may access approved content 250 by, for example, downloading approved content 250, listening to approved content 250, watching approved content 250, playing approved content 250, or the like. Additionally, users 120 may provide a ranking for content evaluation entity 115 after accessing content that may be approved such as approved content 250, as described above. Such a ranking may be received by content distribution system 130 and may be used to determine whether content evaluation entity 115 may continue to rate and/or review submitted content, for example.

Figure 3:
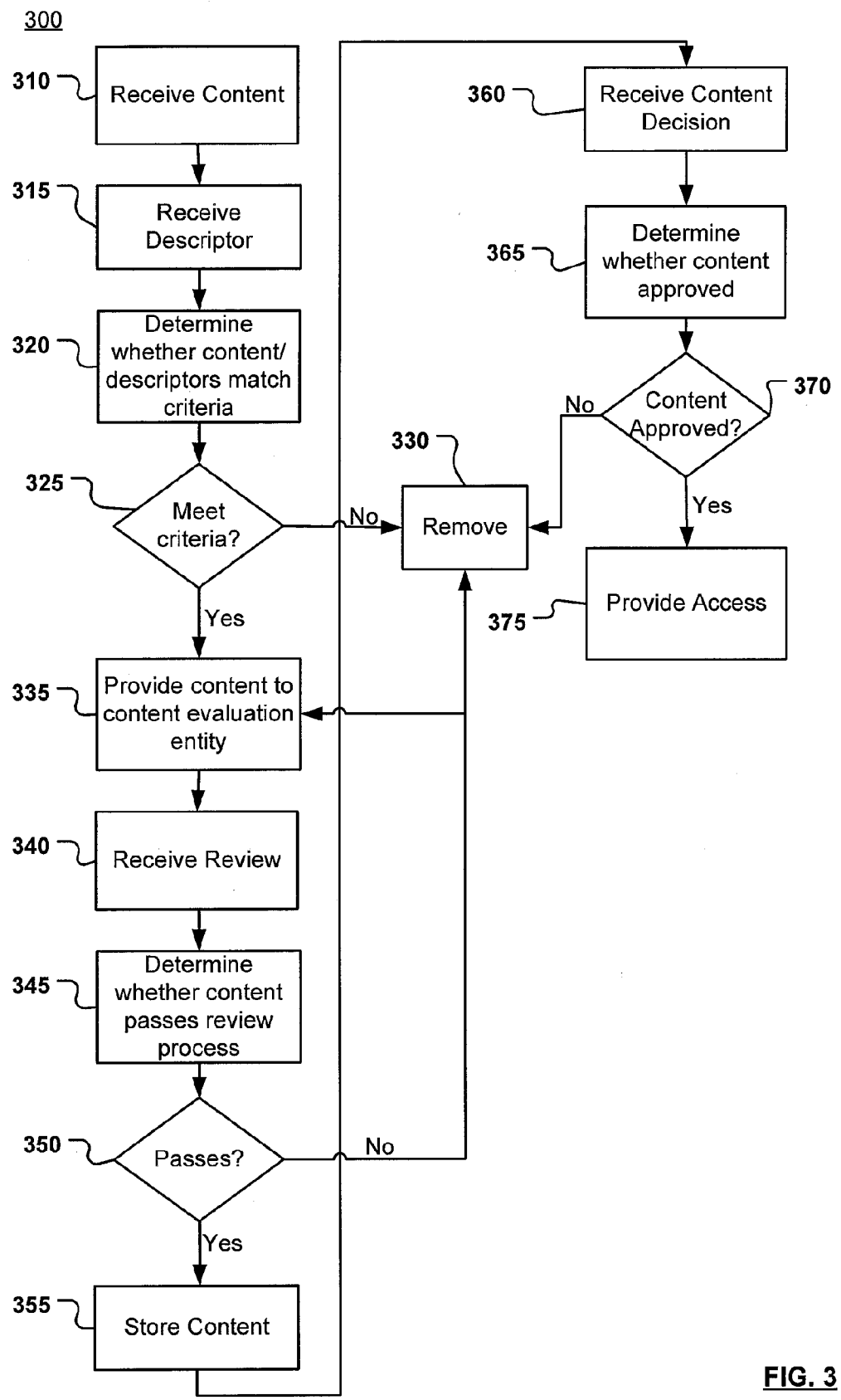
FIG. 3 depicts a flow diagram illustrating an example method of reviewing content to an example embodiment.

FIG. 3 depicts a flow diagram illustrating a method of providing access to content according to an example embodiment. According to one embodiment, method 300 of FIG. 3 may represent actions taken by one or more of the components of the systems described above in FIGS. 1 and 2. At 310, a content evaluation system may receive content such as video games, music, movies, videos, or the like from a user. The content evaluation system may include any combination of hardware components such as processors, databases, storage drives, registers, RAM memory chips, data buses, or the like and/or software components such as operating systems, database management applications, or the like. For example, the content system may be a network-based server that may provide digital content such as video games, music, movies, videos, or the like to users. The content distribution system may be in communication with the user via an electronic device that may be connected to a network. The user may log onto the content evaluation system by supplying credentials such as a username, a password, or the like. The user may then be authenticated by the content evaluation system. For example, the content distribution system may include an authentication module that may determine whether the user may be a registered user and, thus, the user may provide content to the content distribution system. The user may be authenticated by the authentication module using, for example, tokens to verify the identity of the user. Additionally, the user may be authenticated by an externally based authentication system.

According to one embodiment, the content distribution system may include a content module that may receive and store the content that may be provided by the user after authentication. The content module may include, for example, RAM memory chips, registers, hard drives, or any other suitable hardware components designed to store data. Additionally, in another example embodiment, the content distribution system may include a content evaluation component. The content evaluation component may include a content evaluation module that may receive and store the content that may be provided by the user after authentication. The content evaluation module may include, for example, M memory chips, registers, hard drives, or any other suitable hardware components designed to store data. In one embodiment, the content evaluation component may receive the content from the content module. Alternatively, the content evaluation component may receive the content directly from the user.

After receiving the content, at 315, the content distribution system may receive one or more descriptors associated with the received content from the user. The descriptors such as metadata may include information to describe the received content. For example, in one embodiment, the received content may include a video game. Associated with the video game may be a descriptor such as metadata that may include information including, but not limited to, genre, category, maturity rating, or the like that may further describe the video game At 320, the content distribution system may determine whether the received content matches one or more criteria or rules. For example, the content and associated descriptors may be compared with criteria such as rules, thresholds, or the like. The content evaluation component of the content distribution system may include a content criteria module that may be configured to store information for determining whether the content may be technically acceptable. The content criteria module may include, for example, memory chips, registers, hard drives, or any other suitable hardware components designed to store data. The content criteria module may include one or more rules such as, for example, a format or file extension requirement of the content, a technical quality such as a required bit rate of the content, a list of valid descriptors that may be provided by the user associated with the content, or the like.

The content evaluation component may further include a content processor component in operative communication with the content evaluation module and the content criteria module. The content processor component may include, for example, a standard processor, a specialized processor, or the like. The content processor component may engage in an initial analysis of content received from a user, at 310, by comparing the content and/or the descriptor associated with the content that may be received and stored in the taxonomy extension module with the rules stored in the content criteria module.

At 325, if the received content and/or descriptors associated with the content correspond to one or more of the rules or criteria in the content criteria module, the content may be removed from the content distribution system at 330. Additionally, a message may be sent to the user that may provide one or more reasons why the content was rejected under the initial analysis performed at 330.

At 325, if the content and/or the descriptors associated with the content correspond to one or more of the rules or criteria in the content criteria module, the content may be provided to a content evaluation entity such that the content may be rated and/or reviewed at 335. In one embodiment, the content evaluation entity may include a community of content evaluators such as intellectual property rights holders, peers of the user, music experts, game experts, or the like. The content evaluation entity may rate the content received, for example, at 310. The content review may include, for example, a numerical value or weight that may correspond to a number of stars that may be used to determine whether to publish the content. For example, the content review may be a quantitative indicator on whether the content evaluation entity may agree or disagree with the content and/or descriptors that may be provided by the users. Additionally, the content review may be a quantitative indicator of whether the content may be humorous, enjoyable, or the like by the content evaluation entity. In one embodiment, the content review for the content may be between ten stars, which may indicate the highest rating, and zero stars, which may indicate the lowest rating.

Then, at 340, the content distribution system may receive the content review from the content evaluation system. For example, the content distribution system may receive the content review for the content provided by the user. The content review may be used by the on system to determine whether to provide access to additional users.

At 345, the content distribution system may determine whether the content passes the content review process based on the content review received at 340. For example, the content distribution system may determine whether the content review exceeds a threshold. Thus, in one embodiment, the content criteria module may also store a threshold indicating the quantitative threshold such as the number of stars needed before content may be accessed by additional users. The content processor component may receive the review from the content evaluation entity and may compare the received review with the threshold review.

At 350, if the content does not pass the content review process, for example, the content does not exceed the content threshold, the content may be removed from the content evaluation system at 330. According to one embodiment, the content may be removed from the content evaluation system at 330 if the content review may exceed a negative threshold. Additionally, a message may be provided by the content evaluation system to the user providing the content. The message may indicate that the content may have been rejected, because the content may have received a review that exceeded a negative threshold.

Alternatively, at 350, if the content does not pass the content review process, for example, if the content review neither exceeds a threshold review or negative threshold review, the content may be stored in the content distribution system until additional reviews may be provided by, for example, the content evaluation entity such that the additional reviews may provide a content review that may exceed the threshold review or negative threshold review. For example, multiple evaluators may review the content and provide a separate content review. Each content review may be added to a stored cumulative content review in, for example, the content evaluation module. The stored cumulative content review may then be compared to the threshold each time an additional content review may be provided by content evaluation entity. Thus, in one embodiment, the content may be stored in the content distribution system until the cumulative content review exceeds the threshold review or negative threshold review at 350.

At 350, if the content rating passes the content review process, for example the content review exceeds the content threshold, the content may be stored in the content module such that access to the content may be still be limited to a defined group of users such as the content evaluation of the content distribution system at 355. Alternatively, at 350, if the content rating exceeds the content threshold, the content may be stored in the content module such that access to the content may be provided to additional users of the content distribution system at 355. Thus, according to one embodiment, the received content may become publicly accessible after receiving a rating from the content evaluation entity greater than a threshold rating.

At 360, the content distribution system may receive a content decision from the content evaluation system. For example, the content distribution system may receive a content decision provided by the content evaluation entity on whether to provide access to the content to additional users. For example, after receiving the content rating, access to the content may still be restricted to the content evaluation entity. The content evaluation entity may further review the content to make sure the content may not be offensive or obscene, may not violate intellectual property laws, or the like. The content evaluation entity may then issue a content decision indicating approval or rejection of the content based on the additional analysis or review.

At 365, the content distribution system may determine whether the content decision from the content evaluation system indicates approval. At 370, if the content decision indicates approval, access to the content may be provided to additional users at 375. Thus, according to one embodiment, the received content may become publicly accessible after being rated and reviewed by the content evaluation entity. One skilled in the art would recognize the content rating and content decision supplied by the content evaluation entity may also be received by the content distribution system simultaneously.

At 370, if the content distribution system did not approve the taxonomy extension, at 330, the content may be removed from the content evaluation system. Additionally, a message may be provided by the content evaluation system to the user providing the content. The message may indicate that the content may have been rejected, because the content did not receive approval from the content review entity. More specifically, the message may indicate that the content included obscenity, or the like that caused the content to be rejected by the content review entity.

Figure 4:
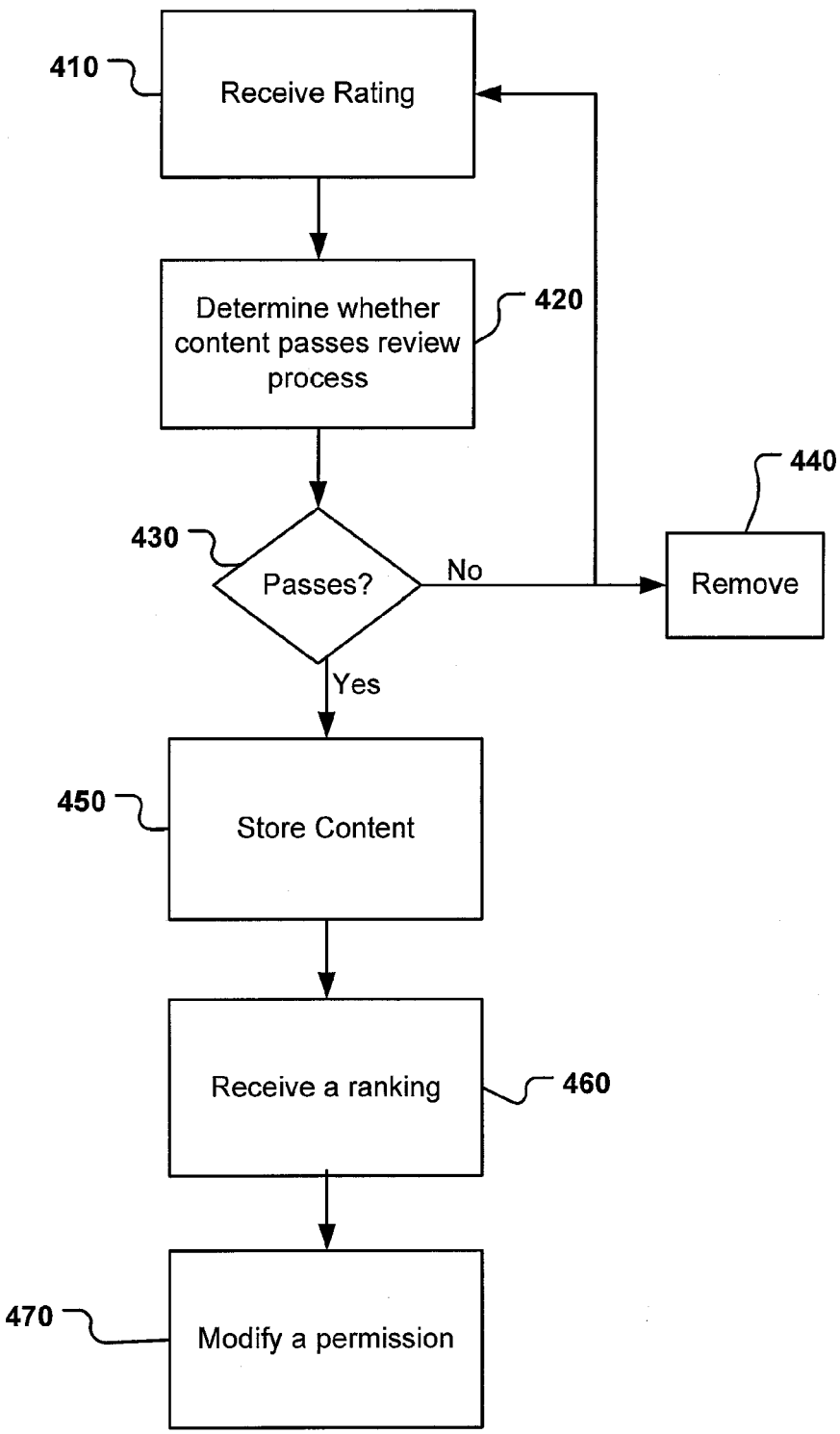
FIG. 4 depicts a flow diagram illustrating a method of ranking a content evaluation entity according to an example embodiment.

FIG. 4 depicts a flow diagram illustrating a method for ranking a content review entity according to an example embodiment. According to one embodiment, method 400 of FIG. 4 may represent actions taken by one or more of the components of the systems described above in FIGS. 1 and 2. At 410, the content distribution system may receive a review for content provided by the content distribution system from a content review entity. The content evaluation system may include any combination of hardware components such as processors, databases, storage drives, registers, RAM memory chips, data buses, or the like and/or software components such as operating systems, database management applications, or the like. For example, the content system may be a network-based server that may provide digital content such as video games, music, movies, videos, or the like to users. In one embodiment, the content distribution system may receive the content review for content generated and provided by a user. The content review may be used by the content evaluation system to determine whether to provide access to additional users.

At 420, the content distribution system may determine whether the content passes the content review process based on the content review received at 410. For example, the content distribution system may determine whether the content review exceeds a threshold. In one embodiment, the content distribution system may include a content criteria module that may store a threshold review indicating the quantitative threshold such as the number of stars needed before content such be accessed by additional users. Additionally, the content distribution system may include a processor in operative communication with the content criteria module. The processor may receive the review from the content evaluation entity and may compare the received rating with the threshold rating.

At 430, if the content does not pass the content review process, for example, the content does not exceed the content threshold, the content may be removed from the content evaluation system at 440. According to one embodiment, the content may be removed from the content evaluation system at 440 if the content review may exceed a negative content threshold. Additionally, a message may be provided by the content evaluation system to the user providing the content. The message may indicate that the content may have been rejected, because the content may have received a review that exceeded a negative threshold.

Alternatively, at 430, if the content does not pass the content review process, for example, if the content review neither exceeds a threshold review or negative threshold review, the content may be stored in the content distribution system until additional reviews may be received by, for example, the content evaluation entity, at 410, such that the additional reviews may provide a content review that may exceed the threshold review or negative threshold review. Thus, in one embodiment, the content may be stored in the content distribution system until a cumulative content review received from multiple reviewers exceeds the threshold review or negative threshold review at 350.

At 430, if the content rating exceeds the content threshold, the content may be stored in the content module such that access to the content may be provided to additional users of the content distribution system at 450. Thus, according to one embodiment, the received content may become publicly accessible after receiving a review from the content evaluation entity greater than a threshold review.

At 460, the content distribution system may receive a ranking corresponding to the received rating for the content. For example, the additional users that may access the content by, for example, watching the content, listening to the content, playing the content, or the like may provide a ranking that indicates whether the users agree with the rating provided by the content evaluation entity.

Then, at 470, the content distribution system may modify a permission for the content evaluation entity based on the ranking. For example, the content evaluation entity may need a certain permission level to rate the content. If the users do not agree with the rating provided by the content evaluation, the ranking of the content evaluation entity may be lowered and, thus, the permission level of the content evaluation entity may also be lowered such that the content evaluation entity may no longer be able to rate content provided by the content distribution system. Thus, according to one embodiment, if the users do not agree with the content review that may that may allow the content to be published, the content distribution system may lower a ranking of the content evaluation entity that may have provided a content review such that the content evaluation entity may no longer be permitted to review content for the content distribution system.

The order of the steps described in FIG. 3 and FIG. 4 is illustrative and may be performed in any other suitable order. For example, the content distribution system may receive a content decision before a review from the content evaluation entity, or vice versa.

Figure 5:
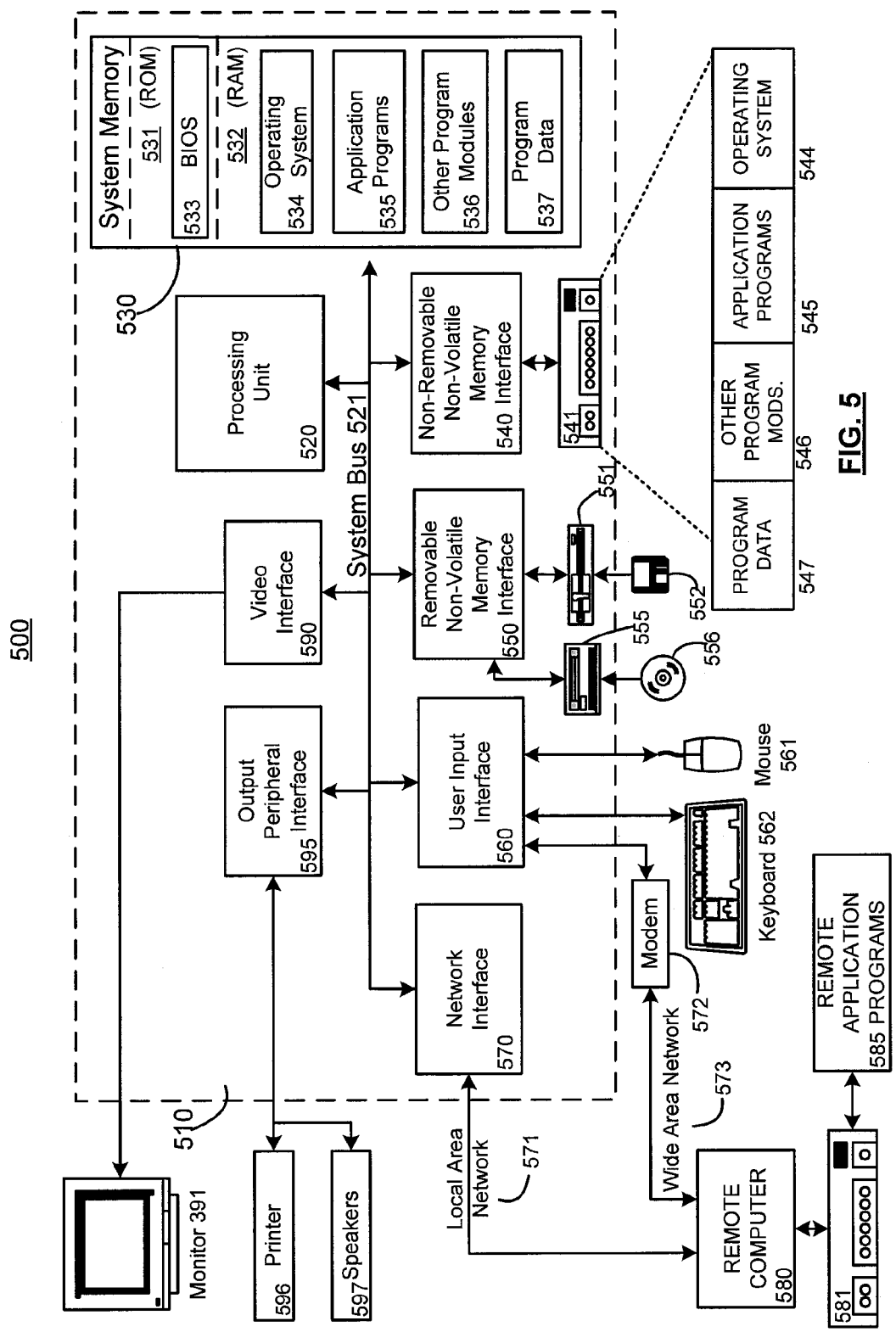
FIG. 5 shows an exemplary computing environment in which aspects of the example embodiments may be implemented.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-readable storage medium, where the medium is not a signal, having computer-readable instructions for reviewing content provided by a content distribution system, the computer-readable instructions comprising instructions for:
   receiving a credential from a user and authenticating the user based on the credential to permit access;
   receiving content generated by the user if, based on the credential, the user is authenticated;
   receiving a review for the content from a content evaluation entity that is non-human;
   determining whether the content passes a review process based on the review;
   providing access to the content to one or more humans if, based on the determination, the content passes the review process;
   receiving from at least one of the one or more humans a ranking indicating an extent to which the at least one of the one or more humans agrees with the review provided by the non-human content evaluation entity for the content; and
   modifying a permission for the non-human content evaluation entity based on the ranking, wherein the permission determines whether the non-human content evaluation entity is allowed to review the content.

2. The computer-readable storage medium of claim 1, further comprising instructions for removing the content if, based on the determination, the content does not pass the review process.

3. The computer-readable storage medium of claim 1, further comprising instructions for:
   receiving at least one descriptor from the user to describe the content;
   associating the descriptor with the content;
   comparing the associated descriptor and content to one or more criteria; and
   providing the content to the content evaluation entity if, based on the comparison, the associated descriptor and content matches the criteria.

4. The computer-readable storage medium of claim 3, wherein the review received from the content evaluation entity indicates whether the descriptor accurately describes the content associated therewith.

5. The computer-readable storage medium of claim 1 further comprising instructions for:
   receiving a content decision regarding the content from the content evaluation entity;
   determining whether the content is approved based on the content decision; and
   providing access to the content if, based on the determination, the content is approved.

6. The computer-readable storage medium of claim 5, wherein providing access to the content includes providing public access if, based on the determinations, the content passes the review process and the content is approved.

7. A method for ranking reviewed content, the method comprising:
   receiving by one or more computer processors a review for the content from a content evaluation entity that is non-human;
   determining by the one or more computer processors whether the content passes a review process based on the review;
   providing one or more humans access to the content if, based on the determination, the content passes the review process;
   receiving from at least one of the one or more humans a ranking indicating an extent to which the at least one of the one or more humans agrees with the received review for the content; and
   modifying by the one or more computer processors a permission for the non-human content evaluation entity based on the ranking.

8. The method of claim 7, wherein the permission determines whether the content evaluation entity is allowed to provide one or more additional reviews for content.

9. The method of claim 7 further comprising:
   receiving a content decision regarding the content from the content evaluation entity;
   determining whether the content is approved based on the content decision; and
   providing access to the content if, based on the determination, the content is approved.

10. The method of claim 9, wherein providing access to the content includes providing public access if, based on the determinations, the content passes the review process and the content is approved.

11. The method of claim 10, wherein the ranking is provided by one or more public access users.

12. The method of claim 11, wherein the ranking includes a numerical value indicating whether the public access users agreed with the rating of the content evaluation entity.

13. A server computer system for reviewing content provided by a content distribution system, the system comprising:
   a communications interface to a network, the communications interface accepting login attempts by a user from a remote network computer;
   at least one storage area for program code and data;

a processor for executing the program code, wherein the program code directs the server computer system to perform functions comprising:

providing access to content to a content evaluation entity;

receiving a content decision regarding the content from the content evaluation entity that is non-human;

determining whether the content is approved based on the received content decision;

providing access to the content to one or more humans if, based on the determination, the content is approved;

receiving from at least one of the one or more humans a ranking indicating an extent to which the at least one of the one or more humans agrees with the content decision provided by the non-human content evaluation entity for the content; and modifying a permission for the non-human content evaluation entity based on the ranking, wherein the permission determines whether the non-human content evaluation entity is allowed to review the content.

14. The system of claim 13, wherein the processor further performs the functions comprising removing the content if, based on the determination, the content is not approved.

15. The system of claim 13, wherein the processor further performs the functions comprising:

receiving a credential from a user and authenticating the user based on the credential to permit access; and receiving the content from the user if, based on the received credential, the user is authenticated, wherein the content is generated by the user.

16. The system of claim 15, wherein the processor further performs the functions comprising:

receiving at least one descriptor from the user to describe the content;

associating the descriptor with the content;

comparing the associated descriptor and content to one or more criteria; and providing the content to the content evaluation entity if, based on the comparison, the associated descriptor and content matches the criteria.

17. The system of claim 16, wherein the processor further performs the functions comprising:

receiving a review for the content from the content evaluation entity;

determining whether the content passes a review process based on the review; and providing access to the content if, based on the determination, the content passes the review process.

18. The system of claim 17, wherein the review received from the content evaluation entity indicates whether the descriptor accurately describes the content associated therewith.

19. The system of claim 17, wherein providing access to the content includes providing public access if, based on the determinations, the content is approved and the content passes the content review process.

* * * * *